(12) United States Patent
Bedolla

(10) Patent No.: US 9,259,884 B2
(45) Date of Patent: Feb. 16, 2016

(54) METHOD AND APPARATUS PERTAINING TO REVERSED THERMOFORMED FILM

(71) Applicant: Research In Motion Limited, Waterloo (CA)

(72) Inventor: Jimmy Bedolla, Elgin, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 172 days.

(21) Appl. No.: 13/896,152

(22) Filed: May 16, 2013

(65) Prior Publication Data

US 2014/0342116 A1    Nov. 20, 2014

(51) Int. Cl.
| | |
|---|---|
| *B29C 45/16* | (2006.01) |
| *B29C 70/78* | (2006.01) |
| *B32B 3/08* | (2006.01) |
| *B32B 27/08* | (2006.01) |
| *B29C 45/14* | (2006.01) |
| *B29C 51/26* | (2006.01) |
| *B32B 3/02* | (2006.01) |
| *B29L 31/46* | (2006.01) |
| *H01H 13/705* | (2006.01) |

(52) U.S. Cl.
CPC ........... *B29C 70/78* (2013.01); *B29C 45/14344* (2013.01); *B29C 45/14688* (2013.01); *B29C 45/14811* (2013.01); *B29C 51/266* (2013.01); *B32B 3/08* (2013.01); *B32B 27/08* (2013.01); *B29C 2045/14704* (2013.01); *B29C 2045/14729* (2013.01); *B29C 2045/1693* (2013.01); *B29L 2031/466* (2013.01); *B32B 2250/02* (2013.01); *B32B 2250/24* (2013.01); *B32B 2255/10* (2013.01); *H01H 13/705* (2013.01); *H01H 2229/044* (2013.01); *Y10T 428/23* (2015.01)

(58) Field of Classification Search
USPC .................................. 264/132, 265–268, 296
See application file for complete search history.

(56) References Cited

U.S. PATENT DOCUMENTS

| | | | | |
|---|---|---|---|---|
| 5,514,319 | A | * | 5/1996 | Young ............................ 264/132 |
| 5,681,515 | A | * | 10/1997 | Pratt et al. ..................... 264/153 |
| 5,997,675 | A | * | 12/1999 | Miyake et al. ................. 156/222 |

(Continued)

FOREIGN PATENT DOCUMENTS

| | | |
|---|---|---|
| JP | 11-162278 | 6/1999 |
| WO | 2008/078143 A1 | 7/2008 |
| WO | 2009/022124 A1 | 2/2009 |

OTHER PUBLICATIONS

Matthys, Don; Building the Enterprise C; Jul. 17, 2010; 6 pages; retrieved from the internet at URL: www.culttvrman.com/main/?p=9641 [retrieved on May 2, 2013].

(Continued)

*Primary Examiner* — Atul P. Khare
(74) *Attorney, Agent, or Firm* — Gary S. Winer; Fleit Gibbons Gutman Bongini & Bianco P.L.

(57) ABSTRACT

An apparatus, such as one or more keyboard keys, comprises at least one form-in-place component that comprises an injection-molded core and a thermoformed film conformally co-molded over at least a portion of the core, wherein the thermoformed film has its smoother side facing outwardly and away from the injection-molded core. Reversing of the film provides a suitable surface for high-resolution character artwork and appearance finish. The smoother surface also allows for top clear coating having a matte, satin or high-gloss finish as desired.

14 Claims, 4 Drawing Sheets

(56) References Cited

U.S. PATENT DOCUMENTS

| | | | |
|---|---|---|---|
| 6,103,346 A * | 8/2000 | Nakajo et al. | 428/172 |
| 6,322,738 B1 * | 11/2001 | Sicilia et al. | 264/255 |
| 6,573,463 B2 * | 6/2003 | Ono | 200/5 A |
| 6,632,518 B1 * | 10/2003 | Schmidt et al. | 428/335 |
| 7,070,349 B2 | 7/2006 | Dombrowski et al. | |
| 7,182,907 B2 * | 2/2007 | Shimizu et al. | 264/554 |
| 7,388,576 B2 | 6/2008 | Griffin et al. | |
| 7,655,163 B2 * | 2/2010 | Hayashi et al. | 264/132 |
| 8,002,925 B2 * | 8/2011 | Biteau et al. | 156/163 |
| 8,069,536 B2 * | 12/2011 | Willat et al. | 16/435 |
| 8,330,725 B2 | 12/2012 | Mahowald et al. | |
| 2003/0012592 A1 * | 1/2003 | Min | 400/490 |
| 2006/0019099 A1 * | 1/2006 | Wang et al. | 428/412 |
| 2006/0182981 A1 * | 8/2006 | DeBergalis et al. | 428/473 |
| 2007/0102110 A1 * | 5/2007 | Yuba et al. | 156/285 |
| 2008/0318617 A1 | 12/2008 | Ladouceur et al. | |
| 2009/0262081 A1 | 10/2009 | Chang et al. | |
| 2010/0003523 A1 * | 1/2010 | Sharygin et al. | 428/412 |
| 2010/0032272 A1 | 2/2010 | Chiang | |
| 2011/0168532 A1 | 7/2011 | Tsai et al. | |
| 2012/0012448 A1 | 1/2012 | Pance et al. | |
| 2012/0013979 A1 * | 1/2012 | Biteau | 359/465 |
| 2012/0073941 A1 | 3/2012 | Chen | |

OTHER PUBLICATIONS

Bayer Materialscience., "Bayer MaterialScience Bayfol CR 1-4 Polycarbonate +PBT," downloaded on Jun. 9, 2015, pp. 1-2.

Bayer Materialscience., "Bayer MaterialScience Bayfol CR 4-2 Polycarbonate +PBT," downloaded on Jun. 9, 2015, pp. 1-2.

Bayfol., "Bayfol CR Polycarbonate Film," Professional Plastics., downloaded on Jun. 9, 2015, 1 page.

Chi Mei., Chi Mei Polylac PA-758 ABS—Transparent., downloaded on Jun. 9, 2015, pp. 1-2.

Chi Mei., POLYLAC PA-758., downloaded on Jun. 9, 2015, pp. 1-2.

* cited by examiner

METHOD AND APPARATUS PERTAINING TO REVERSED THERMOFORMED FILM

RELATED APPLICATIONS

This application is related to co-pending and co-owned U.S. patent application Ser. No. 13/896,119, filed May 16, 2013, entitled method and apparatus pertaining to a keyboard cover having light-masking paint and filed on even date herewith, which is incorporated by reference in its entirety herein.

This application is also related to co-pending and co-owned U.S. patent application Ser. No. 13/896,096, filed May 16, 2013, entitled method and apparatus pertaining to web-coupled keyboard keys and filed on even date herewith, which is incorporated by reference in its entirety herein

FIELD OF TECHNOLOGY

The present disclosure relates generally to thermoforming and form-in-place manufacturing and corresponding manufactured components.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers and tablets/pads with wireless 802.11 or Bluetooth capabilities.

Portable electronic devices are generally intended for handheld use and ease of portability. Smaller devices are generally desirable for portability. In addition to a display (which may or may not comprise a touch-sensitive display) some portable electronic devices include a physical (i.e., mechanical) keyboard (as versus a so-called virtual keyboard) to facilitate the entry of various alphanumeric and other characters.

The look and feel of such keyboards is important to the user. For example, character artwork on the assertable surfaces of keyboard keys is preferably sharp and well defined. At the same time, many keyboards must serve in highly cost-constrained application settings that preclude the use of materials and/or processing techniques that tend to readily provide a desired high-quality look and feel.

As one example in these regards, keyboard keys manufactured as form-in-place components have offered a suitable surface in the past for character artwork in terms of meeting such user expectations, but as quality expectations increase the relatively-rough exterior surface of a form-in-place component becomes a less suitable canvas for high-quality artwork.

DETAILED DESCRIPTION

Figure 1:
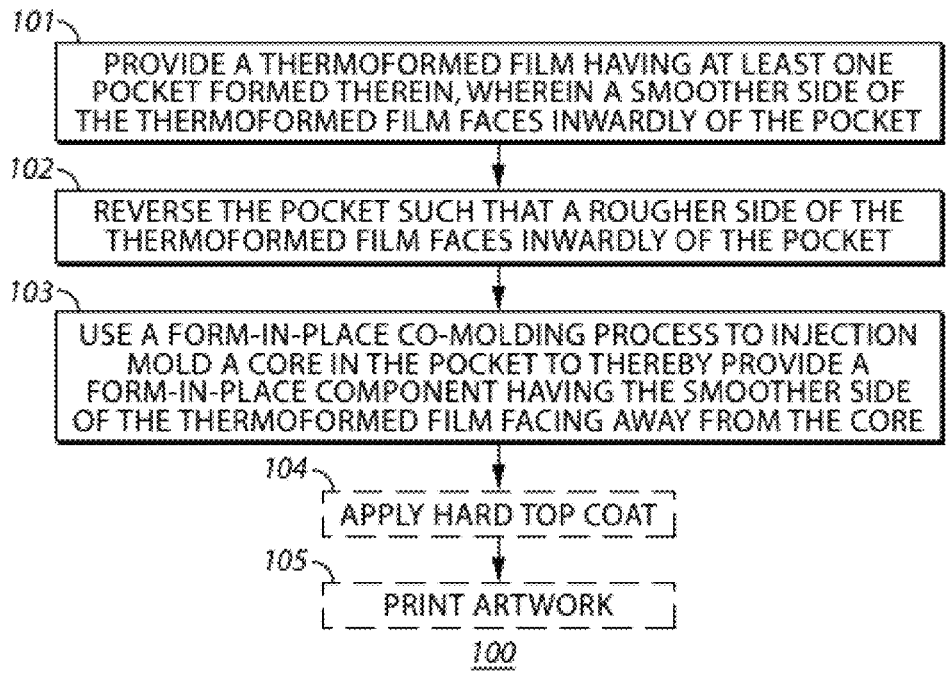
FIG. 1 is a flow diagram in accordance with the disclosure.

The following describes an apparatus and method pertaining to an apparatus, such as one or more keyboard keys, comprising at least one form-in-place component that comprises an injection-molded core and a thermoformed film conformally co-molded over at least a portion of the core, wherein the thermoformed film has its smoother side facing outwardly and away from the injection-molded core.

That smoother side of the thermoformed film, in turn, provides a suitable surface for high-resolution character artwork and appearance finish. The smoother surface also allows for top clear coating having a matte, satin, or high-gloss finish as desired. The overall look and feel of such a keyboard key is of higher quality than those skilled in the art would previously have associated with keyboard keys made using conventional form-in-place processing.

So configured, a keyboard for a portable electronic device can have every appearance, and the feel, of a keyboard that was made using considerably more expensive materials and/or processing. The cost savings can be considerable with some estimates ranging from about fifty cents to about one dollar (U.S. currency) in savings per keyboard as compared to other approaches that yield comparable results.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

FIG. 1 presents a process 100 that illustrates at least some of the present teachings.

Figure 2:
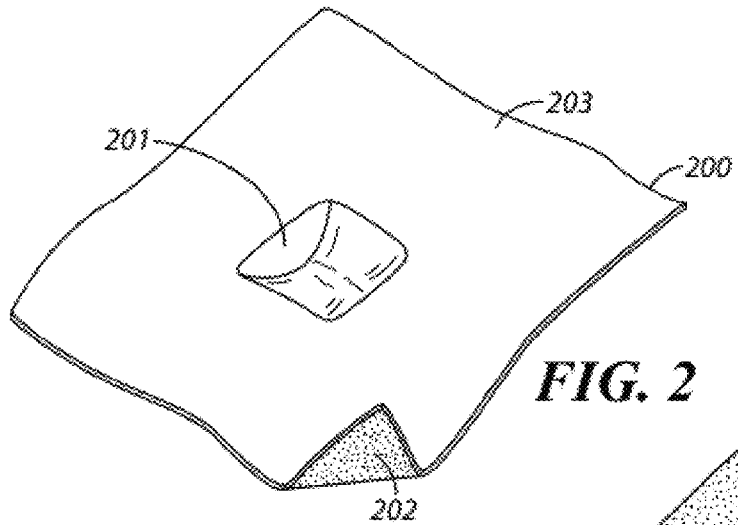
FIG. 2 is a perspective view in accordance with the disclosure.

At 101 (and referring as well to FIG. 2) this process 100 provides a thermoformed film 200 (using, for example, BAYER BAYFOL CR-4-2 translucent, smooth finish film up to 0.125 mm thick) having at least one pocket 201 formed therein. The film 200 itself can comprise a relatively flexible and thin material. Accordingly, the pocket 201 is not rigid or especially well-defined in terms of its overall shape. That said, the general shape and size of the pocket 201 will accommodate a keyboard key core during a later processing step as described below.

Forming such a pocket 201 in such a film 200 comprises a known and well-understood activity. Such an approach has served in the past, for example, to form keyboard keys. Accordingly, further elaboration regarding the details of this activity are not provided here for the sake of brevity.

As is also well known and understood in the art, such a thermoformed film 200 having a feature such as the described pocket 201 will have a first side 202 that is rougher in texture than the opposing side 203. By the nature of the process, that smoother side 203 comprises the inner surface of the pocket 201. Accordingly, by carrying on with a corresponding form-in-place process to thereby injection mold a resin core in that pocket 201, one obtains a component having the rougher side 202 of the thermoformed film 200 facing outwardly and away from the injection-molded core.

At 102 (and referring now to FIG. 3), however, the present process provides for reversing the pocket 201 such that the rougher side 202 of the thermoformed film now faces inwardly of the pocket 201. This reversal comprises a physical reorientation of the pocket 201 that can be accomplished in any of a variety of ways as desired and as appropriate to a given application setting.

Figure 3:
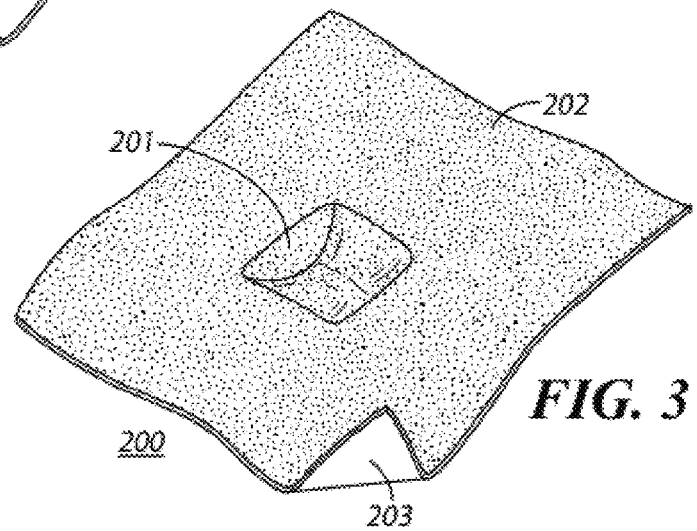
FIG. 3 is a perspective view in accordance with the disclosure.
Figure 4:
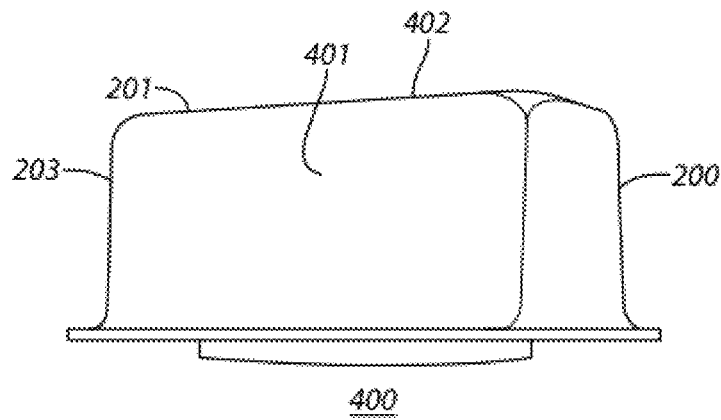
FIG. 4 is a front elevational view in accordance with the disclosure.
Figure 5:
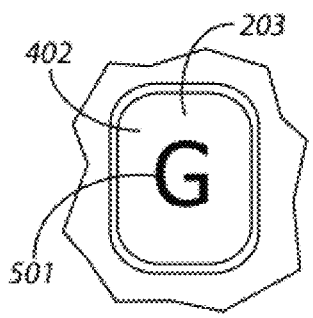
FIG. 5 is a top plan view in accordance with the disclosure.
Figure 6:
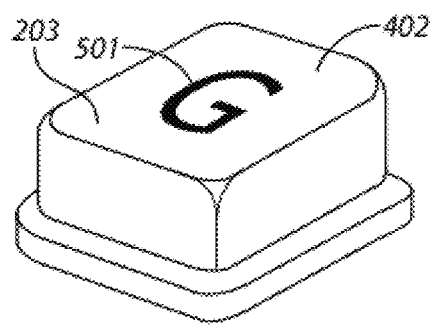
FIG. 6 is perspective view in accordance with the disclosure.

At 103 (and referring as well to FIGS. 4-6) this process 100 then provides for using a form-in-place co-molding process to injection mold a resin core 401 (using, for example, CHIMEI PA-758) in the pocket 201 (that is, the reversed pocket 201 as shown in FIG. 3) to thereby provide a form-in-place component (in this case, a keyboard key 400) having the smoother side 203 of the thermoformed film 200 facing away from the core 401. Is will be well understood by those skilled in the art, the component assumes its final, desired shape during this form-in-place activity. Again, as such form-in-place methodologies are well known and understood in the art, further details are not provided here for the sake of brevity.

By one optional approach and as desired, at 104 a hard transparent top coat 402 can be applied over the keyboard key 400 to further protect the component and/or to lend a particular feel to the key 400. Also as desired, at 105 of the process 100 artwork, such as character artwork, can be printed on the resultant keyboard key 400. The alphanumeric character "G" as denoted by reference numeral 501 illustrates this possibility in FIGS. 5 and 6.

Given the smooth surface of the thermoformed film 200 (which may be made smoother yet by application of the aforementioned top coat 402), and by way of a non-limiting example, a high-resolution, high-quality printing process such as a silk screen mesh printing process will work well in these regards.

The foregoing beneficial results accrue by the unusual and non-traditional reversing of the pocket 201 in the originally-provided thermoformed film 200 as described above. This reversal of sides places the smoother side of the film 200 outwardly of the eventual component 400 and it is this smooth surface that permits the use of higher-quality printing techniques than are traditionally associated with formed-in-place components.

Figure 7:
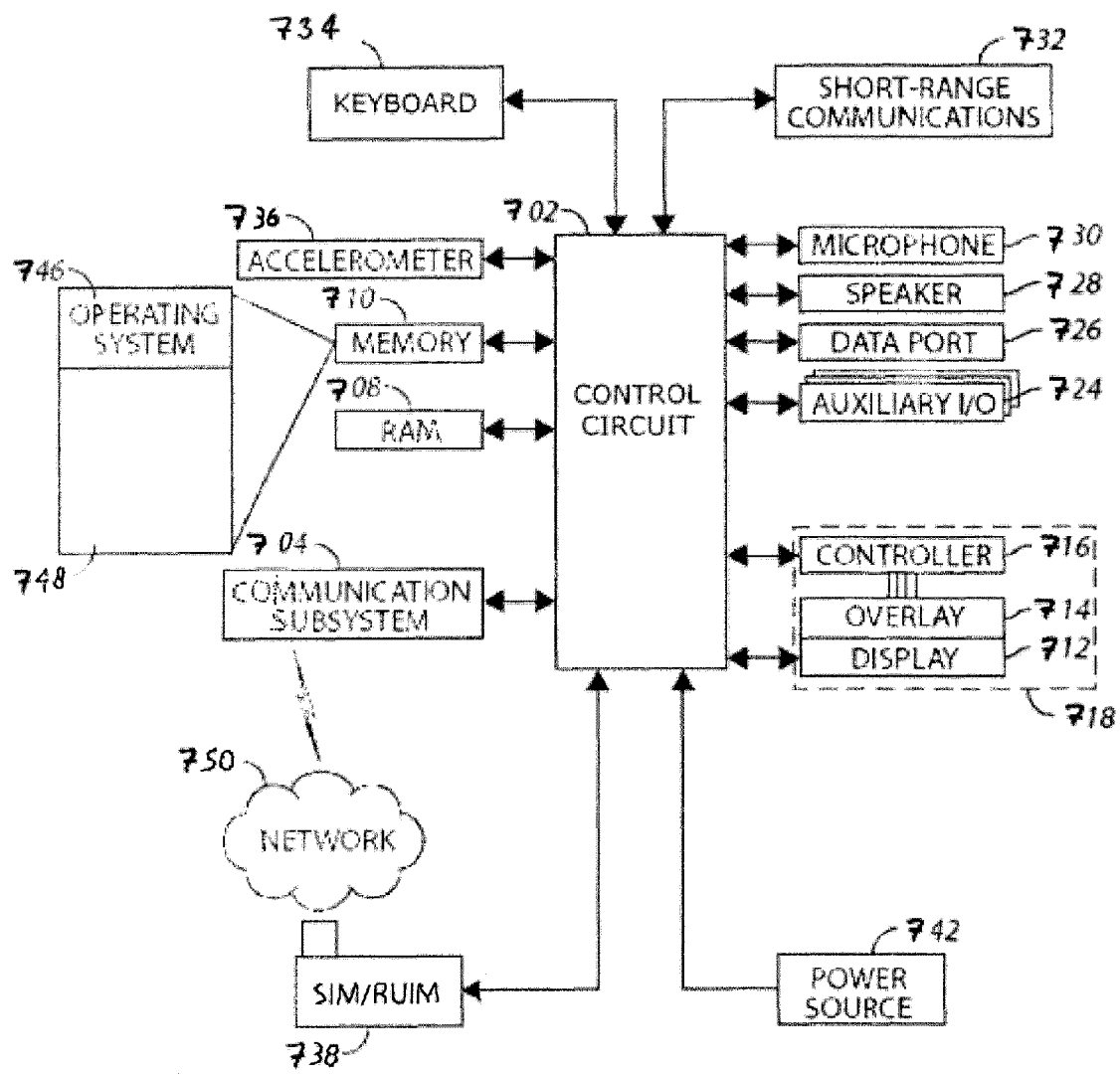
FIG. 7 is a block diagram in accordance with the disclosure.

Such components 400 can serve well in a portable electronic device. Referring to FIG. 7, an exemplary portable electronic device includes a control circuit 702 that controls the overall operation of the portable electronic device. In this particular illustrative example the portable electronic device comprises a portable communications device. Corresponding communication functions, including data and voice communications, are performed through a communication subsystem 704. The communication subsystem receives messages from and sends messages to a wireless network 750.

The wireless network 750 may be any type of wireless network, including, but not limited to, a wireless data networks, a wireless voice network, or a network that supports both voice and data communications. The control circuit 702 may also operably couple to a short-range communication subsystem 732 (such as an 802.11 or 802.16-compatible transceiver and/or a Bluetooth™-compatible transceiver). To identify a subscriber for network access, the portable electronic device may utilize a Subscriber Identity Module or a Removable User Identity Module (SIM/RUIM) card 738 for communication with a network, such as the wireless network 750. Alternatively, user identification information may be programmed into a memory 710.

A power source 742, such as one or more rechargeable batteries or a port to an external power supply, powers the electronic device. The control circuit 702 may interact with an accelerometer 736 that may be utilized to detect direction of gravitational forces or gravity-induced reaction forces. The control circuit 702 also interacts with a variety of other components, such as a Random Access Memory (RAM) 708, a memory 710, an auxiliary input/output (I/O) subsystem 724, a data port 726, a speaker 728, a microphone 730, and other device subsystems 734 of choice.

A display 712 can be disposed in conjunction with a touch-sensitive overlay 714 that operably couples to an electronic controller 716. Together these components can comprise a touch-sensitive display 718 that serves as a graphical-user interface. Information, such as text, characters, symbols, images, icons, and other items may be displayed on the touch-sensitive display 718 via the control circuit 702.

The touch-sensitive display 718 may employ any of a variety of corresponding technologies including but not limited to capacitive, resistive, infrared, surface acoustic wave (SAW), strain gauge, optical imaging, dispersive signal technology, and/or acoustic pulse recognition-based touch-sensing approaches as are known in the art. If the touch-sensitive display 718 should utilize a capacitive approach, for example, the touch-sensitive overlay 714 can comprise a capacitive touch-sensitive overlay 714. In such a case the overlay 714 may be an assembly of multiple stacked layers including, for example, a substrate, a ground shield layer, a barrier layer, one or more capacitive touch sensor layers separated by a substrate or other barrier, and a cover. The capacitive touch sensor layers may comprise any suitable material, such as indium tin oxide (ITO).

One or more touches, also known as touch contacts or touch events, may be detected by the touch-sensitive display 718. The control circuit 702 may determine attributes of the touch, including a location of a touch. Touch location data may include data for an area of contact or data for a single point of contact, such as a point at or near a center of the area of contact. Generally speaking, a swipe is a touch that begins at one location on the touch-sensitive display 718 and ends at another location (as when the user places their fingertip on the touch-sensitive display 718 and then drags their fingertip along the surface of the touch-sensitive display 718 before finally lifting their fingertip from that surface).

The portable electronic device includes an operating system 746 and software programs, applications, or components 748 that are executed by the control circuit 702 and are typically stored in a persistent, updatable store such as the memory 710. Additional applications or programs may be loaded onto the portable electronic device through the wireless network 750, the auxiliary I/O subsystem 724, the data port 726, the short-range communications subsystem 732, or any other suitable subsystem 734. The memory 710 may comprise a non-transitory storage media that stores executable instructions which, when executed, causes one or more of the functions, steps, or actions described herein.

As a communication device, a received signal such as a text message, an e-mail message, or web page download is processed by the communication subsystem and input to the control circuit 702. The control circuit 702 processes the received signal for output to the display 712 and/or to the auxiliary I/O subsystem 724. A user may generate data items, for example e-mail messages, that may be transmitted over the wireless network 750 through the communication subsystem. For voice communications, the overall operation of the portable electronic device is similar. The speaker 728 outputs audible information converted from electrical signals, and the microphone 730 converts audible information into electrical signals for processing.

The control circuit 702 further operably couples in this illustrative example to keyboard 734 having keys comprised of the components 400 described herein. This keyboard 734 can comprise, for example, a QWERTY keyboard that includes a complete set of alphabetic characters along with various numerals, grammatical symbols, and so forth as desired.

Figure 8:
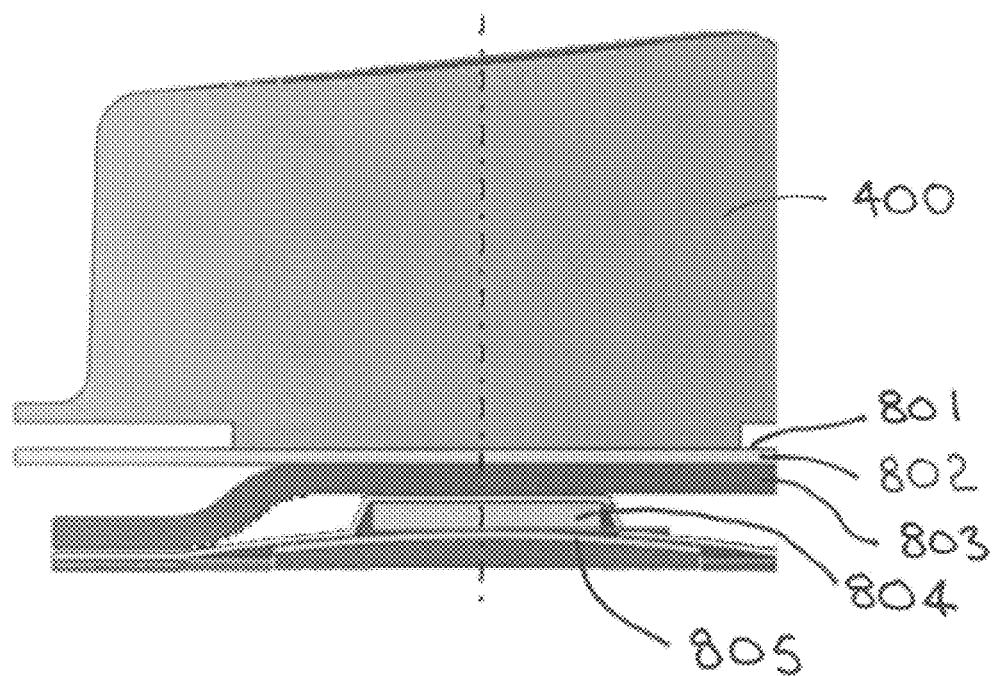
FIG. 8 is a cross-sectional side view of a key in accordance with the disclosure.

FIG. 8 provides some further illustrative details as regards one approach to the individual keys 400 of such a keyboard 734. In this example each key 400 is atop a thermoplastic polyurethane layer 801 that is, by way of example, 0.18 millimeters thick and having a black-colored topside and a matte white-colored bottom side. Next is a thermoplastic polyurethane light guide film 802 having a thickness of about 0.2 millimeters followed by a dome sheet 803, an actuator 804, and a dome switch 805 having a collective height of about 0.493 millimeters. So configured, pressure exerted by a user upon the key 400 will urge the latter towards the actuator 804. The actuator 804 in turn will then contact the dome switch 805 and cause the latter to close (hence sensing and marking the user's assertion of a particular key 400).

The present disclosure may be embodied in other specific forms without departing from its essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method of forming a layered component of an electronic device, the method comprising:
    reversing a pocket formed by a thermoformed film, the thermoformed film having a smooth finish on a smoother side forming the pocket and a rougher side having a finish that is rougher than the smoother side, so that a concave surface portion of the smoother side of the thermoformed film facing inwardly towards an interior cavity of the pocket changes into a convex surface portion facing outwardly away from an interior cavity of a new resulting pocket formed from the rougher side as a result of said reversing; and
    injecting a resin core into the interior of the new pocket and into contact with the rougher side to thereby combine the resin core and new pocket of the reversed film into a layered component having the smoother side of the reversed film facing away from the core.

2. The method of claim 1, wherein the layered component comprises a keyboard key.

3. The method of claim 1, wherein the reversed film is conformally disposed about at least a portion of the core.

4. The method of claim 3 further comprising printing at least one key symbol on the smoother side of the reversed film.

5. The method of claim 4, wherein the printing comprises printing using a silk screen-mesh printing process.

6. The method of claim 3 further comprising disposing a clear layer over at least a portion of the reversed film.

7. The method of claim 1, wherein said injecting is conducted by a form-in-place co-molding process.

8. The method of claim 1, wherein the thermoformed film is translucent.

9. The method of claim 1, wherein the thermoformed film is formed from a blend of polycarbonate and polyester.

10. The method of claim 1, wherein the thermoformed film is formed from a blend of polycarbonate and polybutylene terephthalate.

11. The method of claim 1, wherein the injected resin is acrylonitrile butadiene styrene.

12. The method of claim 1 wherein the thermoformed film comprises polycarbonate.

13. The method of claim 1, wherein the injected resin is transparent.

14. The method of claim 1, wherein a convex surface portion of the rougher side of the thermoformed film is caused to change into a concave surface portion forming the new pocket as a result of said reversing.

* * * * *